Aug. 26, 1930.                    F. A. GERDES                    1,773,990
                                   AIR BRAKE
                              Filed Sept. 7, 1928           3 Sheets-Sheet 1
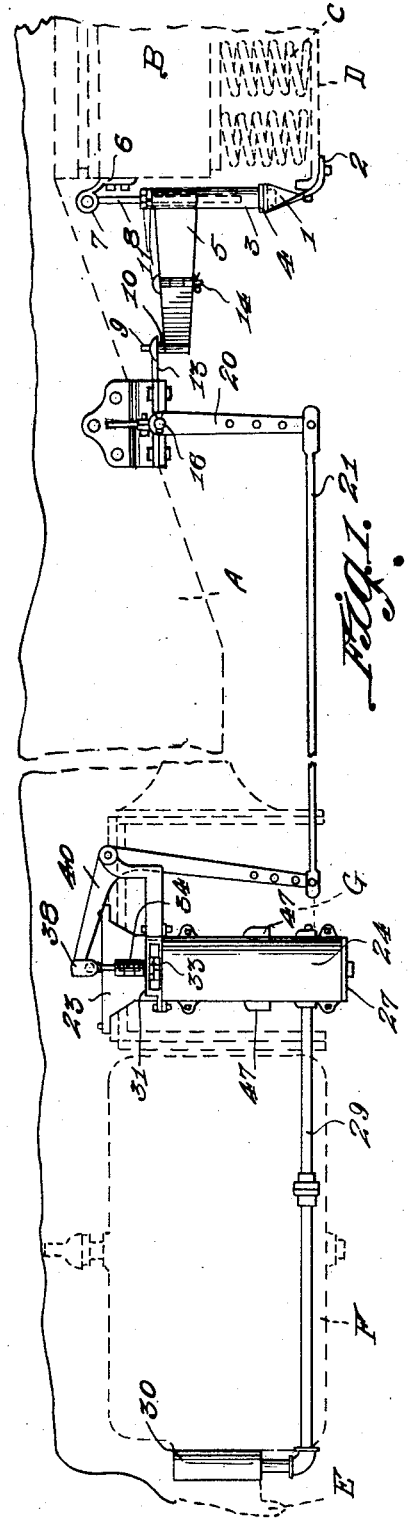
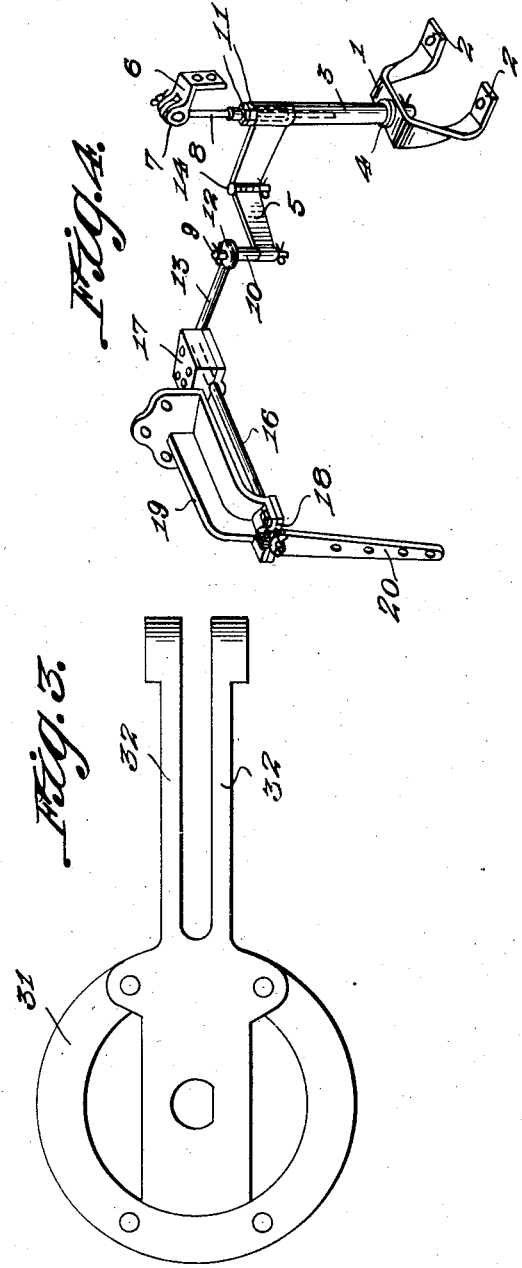

Aug. 26, 1930.    F. A. GERDES    1,773,990
AIR BRAKE
Filed Sept. 7, 1928    3 Sheets-Sheet 2
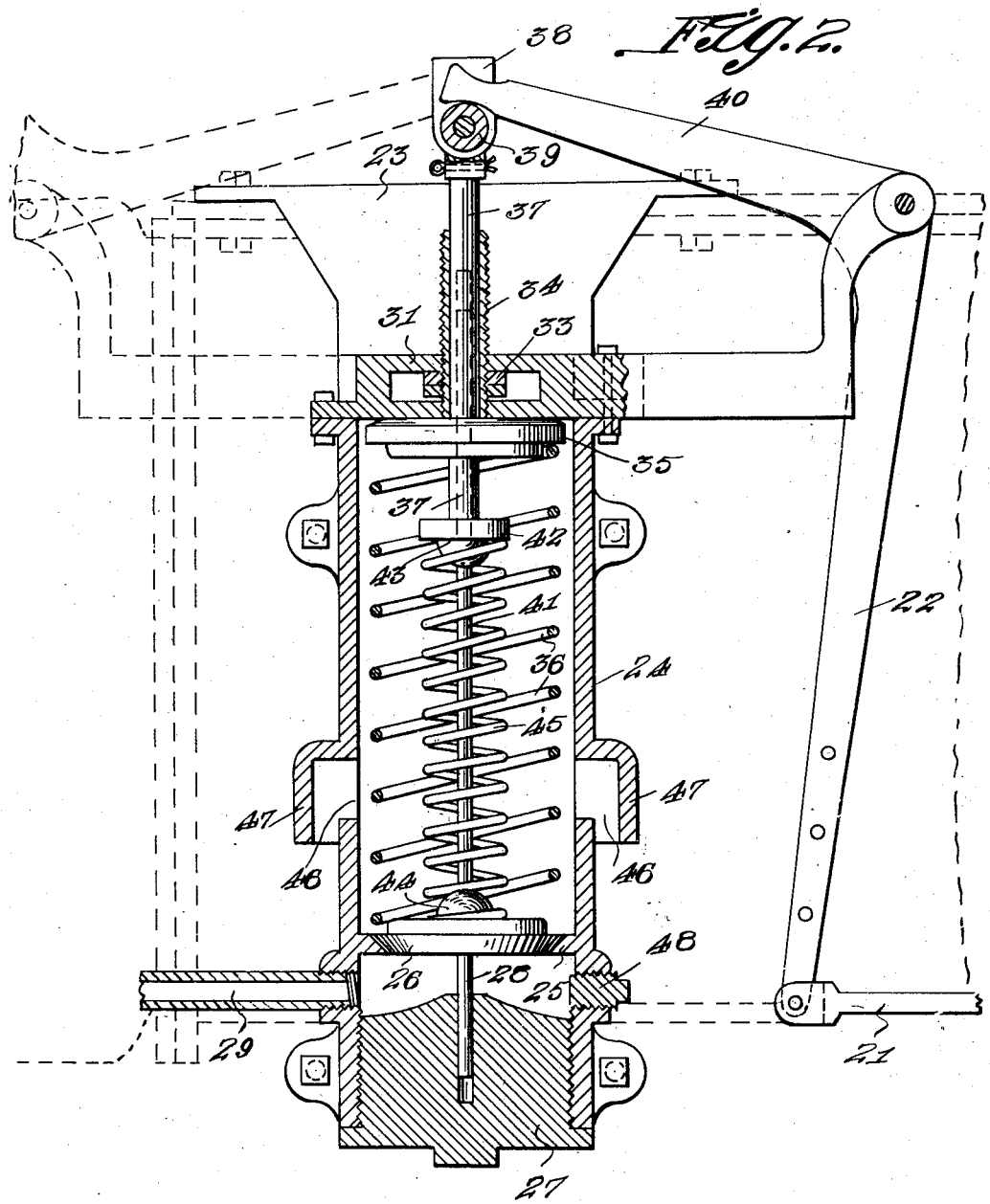
Frederick A. Gerdes,
INVENTOR
BY Victor J. Evans
ATTORNEY

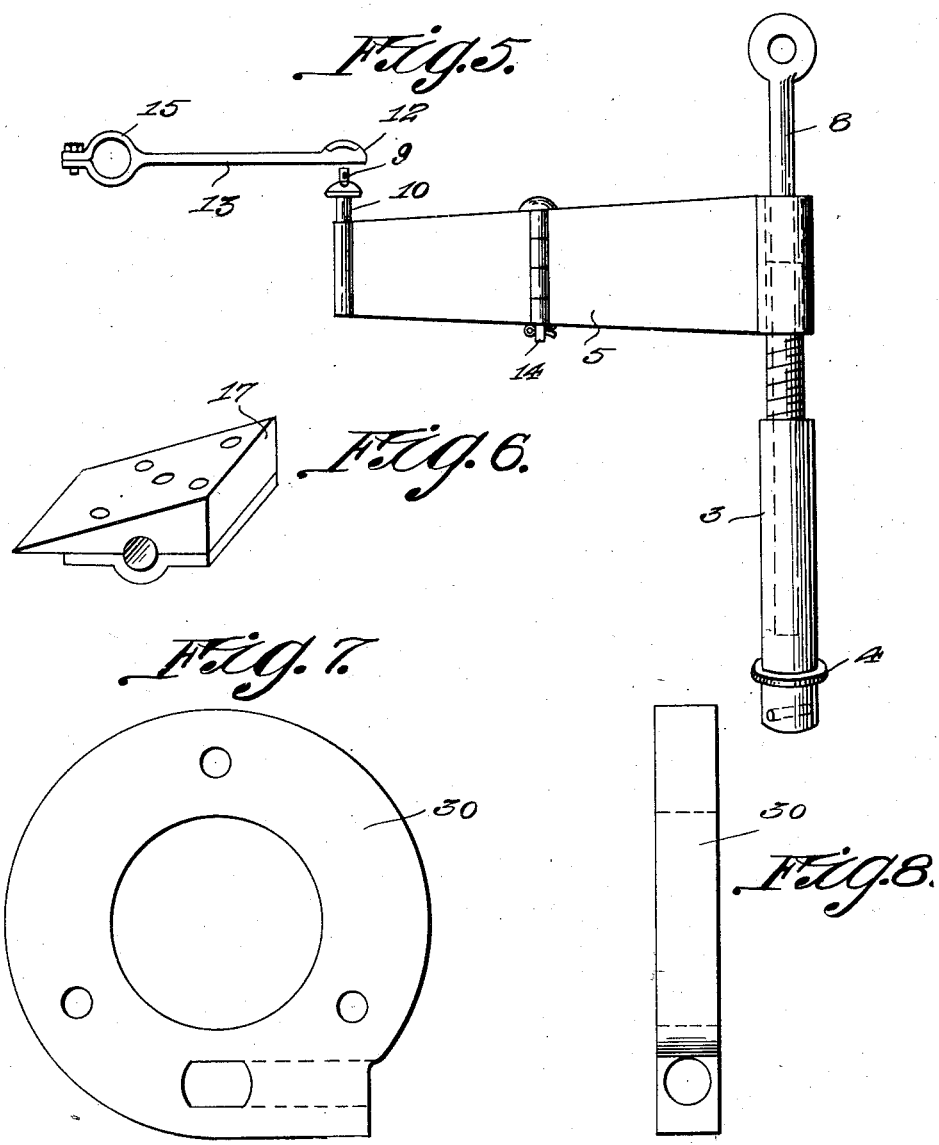

Patented Aug. 26, 1930

1,773,990

UNITED STATES PATENT OFFICE

FREDERICK ANDREW GERDES, OF ALGIERS, LOUISIANA

AIR BRAKE

Application filed September 7, 1928. Serial No. 304,529.

This invention relates to railway cars and its general object is to provide an apparatus for automatically controlling the air pressure to the brake cylinder of the brakes of a car in accordance with the weight of the latter with the result greater pressure will be applied to the brakes when the car is loaded than when the car is empty, therefore braking of cars will be uniform in a train, which will prevent sliding of wheels with accompanying damage thereto as well as damage to the draft gears and other parts and the cars will come to a stop without depending upon each other, regardless of whether some of the cars are heavily loaded while others are empty or some are light or wooden and others are heavy or made from steel.

A further object of the invention is to provide an apparatus for automatically controlling the air pressure to the brakes of a railway car in accordance with the weight of the latter, that can be installed on any car employing air brakes, is simple in construction, inexpensive to manufacture and install and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation illustrating the application of my apparatus to a car.

Figure 2 is an enlarged detail view of the valve and its associated parts.

Figure 3 is a similar view of the valve head and bell crank lever supporting means.

Figure 4 is a perspective view of linkage, securing and supporting means of parts of my apparatus to be hereinafter explicitly referred to.

Figure 5 is an enlarged view illustrating the hinge which operates when the car is rounding a curve, and also shows the hinge supporting means as well as a part of the linkage.

Figure 6 is a perspective view of the shaft bearing block.

Figure 7 is a side elevation of the cut-in T.

Figure 8 is an edge view thereof.

Referring to the drawings in detail, the letter A indicates a car or the center sill thereof, B the truck bolster, C the springs, D the spring plank, E the triple valve, F the auxiliary air tank or reservoir and G the brake cylinder. The structure just referred to forms no part of the present invention and is generally usually employed as regular equipment on railroad cars and the like now in use.

The apparatus which forms the subject matter of the present invention includes a substantially U-shape bracket 1 having apertured tongues 2 bent at right angles to the bracket proper for the purpose of receiving securing means such as bolts and the like for fixing the bracket to the spring plank as clearly shown in Figure 1 of the drawings. The bight portion of the bracket is provided with an opening to accommodate the lower end of a tubular member 3 having a collar 4 formed adjacent its lower end to limit its movement with respect to the bracket, and to prevent upward movement of the tubular member 3, it is provided with a transverse bore for receiving a cotter pin as shown.

The upper end of the tubular member 3 is reduced and this reduced portion is threaded for a portion of its length for the purpose of accommodating nuts 11 for securing one of the leaves of a hinge 5 to the reduced portion. Secured to the trunk bolster B is a bracket 6 terminating at its outer end in spaced parallel eyes 7 which receives a pin passing through the eyed upper end of a slide pin 8 which is mounted for slidable movement in the tubular member 3 and is movable accordingly in accordance with the weight of the car as will be apparent.

The other leaf of the hinge 5 terminates in a barrel which has secured therein a pin 9, and this pin accommodates the sleeve 10 of a substantially semi-spherical member which is formed with an opening through which passes the pin 9 and the semi-spherical member receives a socket member 12 for fitting engagement therewith as suggested in Figure 5. A pin 14 pivotally secures the leaves of the hinge together.

The socket member 12 is formed with a slot for receiving the pin 9 so as to allow the socket member to rock on the semi-spherical member and a washer is disposed over the slot, while the cotter pin is passed through an opening formed in the upper end of the pin 9 for securing these parts associated.

The socket member 12 has formed therewith and extending therefrom an arm 13 which terminates in a clamp 15 for securing the arm 13 to a shaft 16. Secured to the underside of the center sill as shown or at any other appropriate place, is a bearing block 17 which has one end of the shaft journaled therein while its opposite end is supported and journaled in the bearing end 18 of a bracket 19 secured to and extending laterally from the center sill as best shown in Figure 1.

The outer end of the shaft 16 has secured thereto a lever 20 having arranged therein a plurality of openings for adjustably receiving one of the ends of a rod 21 while its opposite end is likewise received in any one of a plurality of openings formed in one of the ends of a bell crank arm 22.

From the structure just described, it will be obvious that as the weight of the car increases or decreases while loading or unloading, the end of the arm 13 that is secured to the shaft 16 will raise or lower as the case may be and due to the fact that the end of the arm that is secured to the socket member 12 is held in substantially stationary position, such a movement of the arm will rotate the shaft 16 which will in turn rock the lever 20 for moving the rod 21 accordingly and for a purpose which will be presently apparent.

The hinge 5 operates to prevent breakage of the parts when the car is rounding curves.

Supported adjacent to the brake cylinder G through the instrumentality of a bracket 23 which is fixed to the brake cylinder, is a valve casing 24 having arranged therein adjacent its lower end a valve seat 25 for the purpose of accommodating a valve 26. The lower end of the valve casing is closed by a plug 27 which is provided with a bore to accommodate the valve stem 28.

The casing 24 is in communication with the pipe that leads from the triple valve E to the brake cylinder G, and this communication is provided by a pipe line 29 having one end in connection with the casing while its opposite end is connected to a cut-in T 30 which is preferably arranged between the triple valve E and the auxiliary tank or reservoir F as clearly shown in Figure 1 of the drawings. This cut-in T is best shown in Figures 7 and 8, and also provides a coupling for securing the triple valve to the reservoir. However, the valve casing 24 can be tapped in at the extreme rear end of the brake cylinder G or any other desirable place, providing of course it is in communication with the pipe or tube that feeds the cylinder G from the reservoir F.

The valve casing 24 is provided with a head 31 having extending therefrom a pair of spaced parallel arms 32 terminating in bearings to accommodate a pin for pivotally securing the bell crank lever 22 between the arms as best shown in Figure 2. The head 31 is centrally recessed so access may be had to lock nuts 33 which are threadably secured to the threaded exterior surface of a sleeve 34 which passes through the head 31 and has formed with its lower end a plunger head 35 disposed in the casing and which is adapted to receive the upper convolution of a relative large coil spring 36, while the lower convolution of said coil spring engages the valve 26. By this construction, it will be apparent that by threading the lock nuts 33 on the sleeve 34, the tension of the coil spring 36 with respect to the valve will be regulated. Mounted for slidable movement in the sleeve 34 is a rod 37 having a substantially inverted U-shaped member 38 secured to its upper end with a roller 39 mounted therein. The short arm 40 of the bell crank arm 22 has a reduced free end for engagement with the roller. The rod 37 is hollow for a portion of its length to accommodate a stem 41 which acts as a guide and has its lower end secured to the valve 26. The lower end of the rod 37 terminates in a flange 42 having a rounded projection 43 depending therefrom and which co-operates with the projection 44 rising from the valve 26 to receive the end convolutions of a relatively small coil spring 45. It will be apparent that when the bell crank lever 22 is moved, the tension of the coil spring 45 is varied in accordance with the movement of the bell crank arm.

The valve casing 24 is formed with exhaust ports 46 in diametrically opposite sides thereof as shown in Figure 2, and these ports are provided with shields 47. A test port is also formed in the valve casing 24 and is closed by a plug 48.

While I have shown a bell crank arm 22 arranged in one position as shown in full lines in Figure 2, this arrangement as well as the arrangement of the valve head 31 can be reversed as shown in dotted lines so as to accommodate low hung air equipment.

From the above description and disclosure of the drawings, it will be obvious that I have provided an apparatus for automatically controlling the air pressure to the brake cylinder of the brakes of railway cars, and the pressure is retained in the brake cylinder in accordance with the weight of the car, as when the weight of the car increases, it gradually lowers the body on the springs C which will result in the rocking of the shaft 16 and movement of the rod 21 which movement compresses the coil spring 45 for increasing the pressure upon the valve 26. As the car is unloaded, the movements are reversed from that just described. The coil spring 36 is adjusted to retain the valve on its seat to meet the unloaded condition of a car, and this adjustment is made through the medium of the lock nuts 33 as above set forth and after this adjustment is made, the apparatus will automatically meet all of the conditions regardless of the weight of the car, its load, or curves in the track.

The apparatus also prevents wrecks, as it eliminates empty cars from sliding on their rails, as such cars at times climb the rails. It also prevents wear of the rails as well as of the wheels of cars as the sliding of wheels will be eliminated due to the fact that the correct pressure will be provided in the brake cylinders in accordance with the weight of the car.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An apparatus for automatically controlling the air pressure to the brake cylinder of the brakes of a railway car, comprising a valve casing, a spring pressed valve arranged therein, means for adjusting the normal spring pressure on said valve, means for adjusting the operating spring pressure on said valve, a rod included in the last mentioned means and being associated with a spring of the valve for varying the spring pressure on the valve, a bell crank pivoted midway its ends and being associated with the rod for controlling the movement thereof, means secured to a stationary part of the car, means having connection with the body of the car, a hinge connection between the last mentioned means, an arm included in the hinge connection, a socket member formed with said arm, a pin carried by a leaf of the hinge connection, a sleeve on the pin, a semi-spherical member having an opening to receive the pin, means for securing the socket member on the semi-spherical member for movement, means for connecting the means secured to the body of the car to the bell crank arm for operating the latter, said valve casing being in communication with the brake cylinder, and said valve controlling the communication.

2. An apparatus for automatically controlling the air pressure to the brake cylinder of a railway car, comprising a valve casing having exhaust ports therein and being in communication with the brake cylinder, a spring pressed valve in said casing, means for adjusting the normal spring pressure on said valve, means for adjusting the operating spring pressure on said valve in accordance with the weight of the car and while the car is being loaded or unloaded, said last mentioned means including a bracket secured to the spring plank of the car, a tubular member carried by said spring plank, means for supporting said tubular member in an upright position, a shaft, bearings for said shaft and being secured to the body of the car, an arm having one end secured to one end of said shaft, fulcrum means for the other end of said arm, a hinge between the fulcrum means and the tubular member, a bell crank arm having connection with the opposite end of said shaft, and means operable by the bell crank lever for adjusting a spring of said second mentioned means.

In testimony whereof I affix my signature.

FREDERICK ANDREW GERDES.